US012715542B2

(12) United States Patent
Biechele

(10) Patent No.: US 12,715,542 B2
(45) Date of Patent: Aug. 25, 2026

(54) DRIVE DEVICE FOR AN ELECTRIC BICYCLE AND ELECTRIC BICYCLE

(71) Applicant: PORSCHE EBIKE PERFORMANCE GMBH, Ottobrunn (DE)

(72) Inventor: Johannes Biechele, Ottobrunn (DE)

(73) Assignee: Porsche eBike Performance GmbH, Ottobrunn (DE)

(*) Notice: Subject to any disclaimer, the term of this patent is extended or adjusted under 35 U.S.C. 154(b) by 402 days.

(21) Appl. No.: 18/253,363

(22) PCT Filed: Oct. 4, 2021

(86) PCT No.: PCT/EP2021/077262
§ 371 (c)(1),
(2) Date: May 17, 2023

(87) PCT Pub. No.: WO2022/106106
PCT Pub. Date: May 27, 2022

(65) Prior Publication Data

US 2023/0415847 A1 Dec. 28, 2023

(30) Foreign Application Priority Data

Nov. 19, 2020 (DE) ......................... 102020130601.6

(51) Int. Cl.

| | |
|---|---|
| ***B62M 6/55*** | (2010.01) |
| ***B62M 21/00*** | (2006.01) |
| ***B62M 23/00*** | (2006.01) |
| ***F16H 7/02*** | (2006.01) |

(Continued)

(52) U.S. Cl.
CPC .............. *B62M 6/55* (2013.01); *B62M 21/00* (2013.01); *B62M 23/00* (2013.01); *F16H 7/023* (2013.01); *F16H 37/041* (2013.01); *F16H 49/001* (2013.01)

(58) Field of Classification Search
CPC . B62M 6/40; B62M 6/55; B62M 6/60; B62M 6/70; B62M 11/02; B62M 21/00; B62M 23/00; F16H 7/023; F16H 37/041; F16H 49/001
See application file for complete search history.

(56) References Cited

U.S. PATENT DOCUMENTS

| | | | |
|---|---|---|---|
| 9,140,342 | B2 | 9/2015 | Hoebel et al. |
| 9,302,734 | B2 | 4/2016 | Getta et al. |
| 10,343,746 | B2 | 7/2019 | Doerndorfer |

(Continued)

FOREIGN PATENT DOCUMENTS

| | | | | |
|---|---|---|---|---|
| CN | 107207071 A | | 9/2017 | |
| CN | 109866866 A | * | 6/2019 | ............. B62M 6/55 |

(Continued)

*Primary Examiner* — Adam D Rogers
(74) *Attorney, Agent, or Firm* — Slater Matsil, LLP

(57) ABSTRACT

In an embodiment a driving device for an electric bicycle includes a motor unit having an electric motor configured to drive the electric bicycle, a first gear stage and a second gear stage, wherein the first gear stage is coupled to the motor unit on the one hand and to the second gear stage on the other hand, wherein the second gear stage is configured to output a torque configured to drive the electric bicycle, and wherein the second gear stage is a strain wave gear and is arrangeable coaxially with respect to an axis of rotation of a pedal crank of the electric bicycle.

14 Claims, 7 Drawing Sheets

(51) Int. Cl.

| | |
|---|---|
| ***F16H 37/04*** | (2006.01) |
| ***F16H 49/00*** | (2006.01) |

(56) References Cited

U.S. PATENT DOCUMENTS

| | | | | |
|---|---|---|---|---|
| 11,713,097 | B2 * | 8/2023 | Wang | B62M 6/40 74/640 |
| 2010/0307851 | A1 | 12/2010 | Spanski | |
| 2021/0147034 | A1 | 5/2021 | Wang et al. | |
| 2024/0025512 | A1 * | 1/2024 | Biechele | B62M 23/00 |

FOREIGN PATENT DOCUMENTS

| | | | | |
|---|---|---|---|---|
| CN | 111232120 | A | 6/2020 | |
| CN | 211599452 | U | 9/2020 | |
| DE | 10333951 | B3 | 11/2004 | |
| DE | 102012103355 | A1 | 10/2013 | |
| DE | 202011110841 | U1 | 11/2016 | |
| DE | 102017219608 | A1 | 5/2019 | |
| DE | 102020130599 | B3 * | 3/2022 | B62M 11/10 |
| DE | 102023200995 | B3 * | 6/2024 | F16D 7/027 |
| TW | M593362 | U | 4/2020 | |

* cited by examiner 4
214
23
21
24
22
30
8
20

DRIVE DEVICE FOR AN ELECTRIC BICYCLE AND ELECTRIC BICYCLE

CROSS-REFERENCE TO RELATED APPLICATIONS

This patent application is a national phase filing under section 371 of PCT application no. PCT/EP2021/077262, filed on Oct. 4, 2021, which claims priority to German Patent Application No. 102020130601.6, filed on Nov. 19, 2020, which applications are incorporated herein by reference in its entirety.

TECHNICAL FIELD

The invention relates to a drive device for an electric bicycle and an electric bicycle having such a drive device.

BACKGROUND

Bicycles realize low-cost, easy-to-use and emission-free means of transportation. They have also become widespread as sports or fitness equipment, and types particularly suitable for various sports applications have emerged.

In recent years, there has been growing enthusiasm for electric bicycles (especially so-called “pedelecs”), despite their high weight and price for bicycles. Potential customers are not only older cyclists who are less fit or free of sporting ambitions, but also sporty, younger riders, whether for use on the way to work or because of the possibility of using them to extend the radius of action and/or increase the speed of travel without overstraining one’s own physique. Among mountain bikers in particular, interest in electrically assisted mountain bikes seems to be growing. In the case of electric bicycles, it is a challenge to provide a reliably assisting drive system that allows high power transfer.

SUMMARY

Embodiments provide a reliable drive concept for electric bicycles, which allows a particularly clear and space-saving structure.

According to one embodiment, a drive device for an electric bicycle is disclosed. The drive device comprises a motor unit having an electric motor for driving the electric bicycle. The drive device further comprises a first gear stage and a second gear stage configured to drive the electric bicycle. The first gear stage is coupled on the one hand to the motor unit and on the other hand to the second gear stage. The second gear stage is therefore coupled to the first gear stage on the one hand or on the drive side and is configured to output or provide a torque for driving the electric bicycle on the other hand or on the output side. The second gear stage is configured as a strain wave gear and is arranged coaxially with respect to an axis of rotation of a pedal crank of the electric bicycle or is configured to be arranged coaxially with respect to the pedal crank.

By means of the described drive device, a reliable drive concept for electric bicycles can be realized, which enables a particularly and space-saving structure. The described drive device is particularly suitable for mounting on a lower tube or on a seat tube of the electric bicycle and enables an advantageous harmony in terms of low noise, high efficiency and small size.

The strain wave gear of the second gear stage realizes a backlash-free gear for the transmission of large torques and is also referred to as a strain wave gear or a so-called “harmonic drive”. It enables a high transmission ratio of 100:1, for example, and is also characterized by high rigidity. Such a harmonic drive has, among other things, an elliptical disk element which, as a so-called “wave generator”, forms the drive of the strain wave gear. Furthermore, for example, a deformable cylindrical steel sleeve is provided, which is referred to as a “flexspline” and forms the output of the Harmonic Drive and is deformed in a predetermined manner by rotation of the wave generator. Also provided is an outer element, also referred to as a “circular spline”, which interacts with the flexspline by means of splines so that, for example, each rotation of the wave generator results in relative movement of two teeth of the flexspline with respect to the circular spline.

As an alternative to the strain wave gear, the second gear stage of the drive device can comprise a cycloidal gear, which also implements a backlash-free gear for transmitting large torques. Cycloidal gears transmit torques in a rolling manner by means of cam discs.

The second gear stage is coupled in particular by means of an output shaft to the pedal crank of the electric bicycle or can be coupled to it if an assisting drive is required. The output shaft is in particular fixedly coupled to a gear wheel or chain ring of the electric bicycle or is formed with one of these components. The pedal crank is in particular fixedly coupled to the pedal or pedals of the electric bicycle. The drive unit thus enables the formation of a space-saving and efficient drive in which a pedal operation and an assisting electric drive are combined and coupled, or can be coupled if required, by means of the output shaft.

According to an embodiment of the drive device, the first gear stage is formed as a belt transmission comprising a first and a second gear wheel and a belt element. The belt element couples the two gear wheels to one another, with the first gear wheel being coupled to the motor unit and the second gear wheel being coupled to the second gear stage.

In this way, a beneficial electric drive system for electric bicycles can be provided which includes a low ratio gear stage in the form of the belt gear and a high ratio gear stage in the form of the strain wave gear. Alternatively to the belt transmission, the first transmission stage can also be designed as a spur gear.

According to a further embodiment of the drive device, the second gear stage has a shaft generator, a cylindrical outer ring with an internal toothing, and an elastic transmission element with an external toothing which is formed in a predetermined manner in coordination with the internal toothing of the outer ring. The second gear stage also has a radial coupling element. In an operation for predetermined deformation of the transmission element, the shaft generator is formed as an input and the radial coupling element is formed as an output of the second gear stage. The transmission element is arranged between the outer ring and the radial coupling element and provides a predetermined transmission ratio of the second gear stage.

Such an embodiment concretizes the design of the second gear stage as a strain wave gear, in which, for example, the external toothing of the elastic transmission element have two teeth less than the internal toothing of the outer ring. In addition, the described strain wave gear has the radial coupling element, which enables reliable transmission of a torque from the output of the second gear stage to an output shaft of the drive system or the pedal crank.

If, for example, the first gear stage is designed as a belt drive, as described above, the second gear wheel of the belt drive is coupled to the outer ring of the strain wave gear and the radial coupling element is coupled to the pedal crank.

Thus, a particularly compact and reliable design of the drive device can be realized with a low-ratio and a high-ratio gear stage.

According to a further embodiment of the drive device, the radial coupling element has, with respect to the axis of rotation of the pedal crank, on an outer side a plurality of radial projections formed in coordination with a plurality of recesses formed on an end face of the transmission element facing the radial coupling element. By means of interengagement of the projections and the recesses, the radial coupling element can be coupled to and decoupled from the transmission element along the axis of rotation of the pedal crank.

According to a preferred embodiment, the radial coupling element is thus displaceable along the axis of rotation of the pedal crank. In a coupled state, the radial coupling element thus enables reliable transmission of the torque from the output of the second gear stage to the output of the drive system or drive device, or in an uncoupled state, independent rotation of the pedal crank free of the uncoupled first and second gear stages. Decoupling the pedal crank from the described drive device may be useful, for example, to achieve decoupling of the power flow when the electric bicycle is being pushed backwards and thus to prevent the transmission and motor from being dragged along, or when the drive device requires maintenance to re-establish fault-free or low-resistance operation. In such a case, it is not necessary to co-rotate the gear stages and apply corresponding additional force, and an electric bicycle provided with the drive device can continue to be used as a normal bicycle, so to speak. The drive device thus preferably includes the described axial displaceability of the radial coupling element. Alternatively, however, an axially fixed radial coupling element can also be provided.

According to a further embodiment of the drive device, the radial projections of the radial coupling element are formed such that they protrude beyond the end face of the transmission element in a predetermined manner with respect to a state coupled to the transmission element along the axis of rotation of the pedal crank. In other words, the projections are formed larger or longer than a depth of the recesses. In this way, a secure coupling between the two components and a reliable torque transmission from the transmission element to the radial coupling element can be established. An overlap of the projections depends in particular on the forces acting and can be several millimeters, for example. Alternatively, the projections of the radial coupling element and the end face of the transmission element can be designed in such a way that a one-to-one overlap or congruence of the contact surfaces is established, so that a mechanically reliable coupling can be realized.

According to a further embodiment of the drive device, the second gear stage is arranged and designed in particular in such a way that it coaxially surrounds the pedal crank with respect to the axis of rotation of the pedal crank in a ready-to-operate mounted state. This enables a particularly space-saving and clear structure of the drive device for an electric bicycle and also helps to keep an overall weight low.

According to a further embodiment of the drive device, the motor unit and the gear stages are arranged such that an axis of rotation of the motor unit is aligned parallel to and spaced apart from the axis of rotation of the pedal crank. Such an embodiment also enables a particularly space-saving and uncluttered design of the drive device.

According to a further embodiment, an electric bicycle is disclosed comprising a bicycle frame having a lower frame portion extending to a bottom bracket having a pedal crank.

The electric bicycle comprises a drive device according to one of the previously described embodiments arranged in or on the frame portion such that the second gear stage is arranged coaxially with the pedal crank, such that by means of the second gear stage a torque is transmittable for driving the electric bicycle. The electric bicycle substantially enables the aforementioned features, advantages, and functions.

For example, for attachment to the frame portion, the frame portion has a recess so that the drive device can be reliably received. According to an embodiment, the drive device is arranged, for example, as an assembly in the already coupled state to the frame portion, in particular mounted.

In addition to an electric motor, the described electric drive device for electric bicycles comprises a first low-ratio gear stage, which is preferably designed as a belt gear or spur gear, and a second high-ratio gear stage, which is preferably designed as a strain wave gear or cycloid gear. Preferably, the drive device also comprises the shiftable radial coupling element which transmits the torque from the output of the second gear stage to the output of the drive system and thus contributes to a beneficial and reliable power transmission from the motor unit to the pedal crank of the electric bicycle.

The drive device provides an efficient mechanical system for assisting in cycling and also keeps noise levels low and a design compact. This is made possible in particular by the two-stage gear design, in which, for example, the belt gear can operate very efficiently and quietly at low powers and high speeds, while the strain wave gear can transmit high torques in a very compact installation space.

In order to make the required installation space of the strain wave gear particularly short in axial alignment along the axis of rotation of the pedal crank, the radial coupling element is preferably provided between the output of the strain wave gear and the output of the overall system.

The described embodiments of the drive device enable, among other things, the following advantageous operating characteristics:

- low noise and high efficiency due to a belt gear in the first gear stage.
- high power density and low space requirement in the second gear stage due to the strain wave gear at high torques.
- low space requirement for the second gear stage, since a usually long run-out of an associated output of the strain wave gearbox can be replaced by the short radial coupling element
- low cost, since the second gear stage can be finished from WKZ falling plastic parts or by means of plastic injection molding or from metal die casting party by means of metal die casting, for example of aluminum or magnesium, whereby a competitive power density and a high positional accuracy of the gear can be dispensed with and at the same time a low weight of the drive device can be realized.

BRIEF DESCRIPTION OF THE DRAWINGS

Embodiments, advantages and functions are explained in the following description by means of embodiments with the aid of the attached drawings.

DETAILED DESCRIPTION OF ILLUSTRATIVE EMBODIMENTS

Identical, similar or similarly acting elements are provided with the same reference signs in the figures. For reasons of clarity, not all of the elements shown in all of the figures are marked with the corresponding reference signs, possibly.

Figure 1:
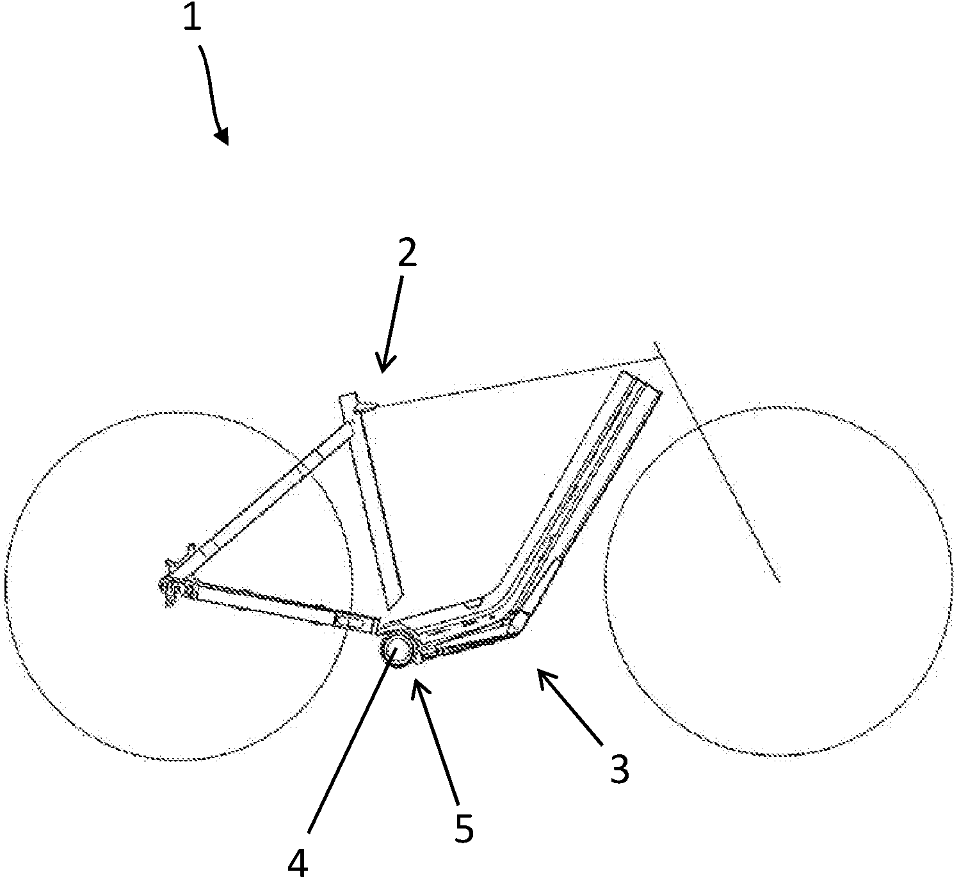
FIG. 1 shows a schematic view of an electric bicycle with a mounted drive device.
Figure 2:
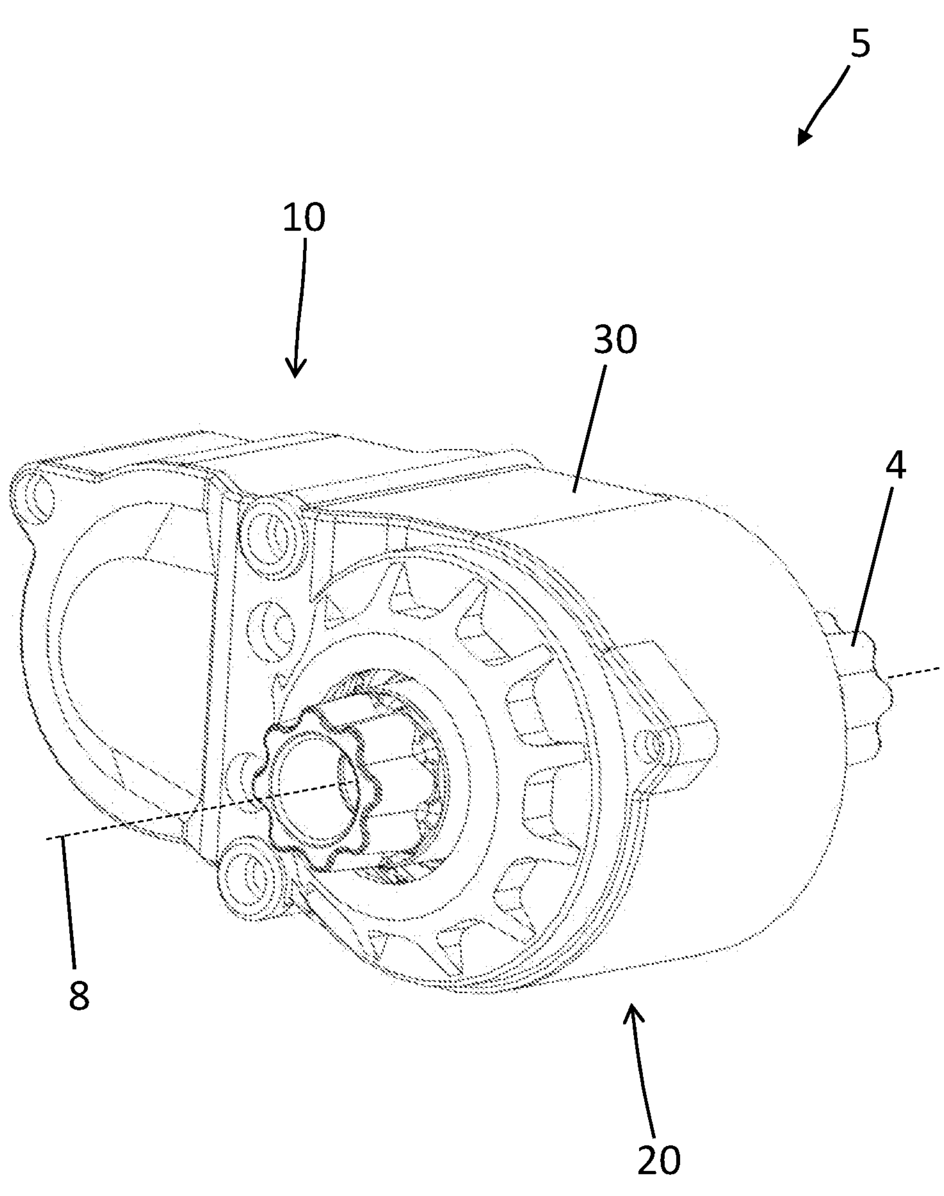
FIGS. 2-6 show schematic perspective views of an embodiment of the drive device for the electric bicycle.

FIG. 1 schematically shows an electric bicycle 1 with a bicycle frame 2 which has, among other things, a lower frame portion 3 which forms a down tube. The frame portion 3 extends towards a bottom bracket, which comprises a pedal crank 4 coupled or couplable to an electric drive device 5 for the electric bicycle 1.

FIGS. 2-6 schematically show an embodiment of the drive device 5 or components of the drive device 5 in various perspective views. FIG. 7 shows components of the drive device 5 in a schematic sectional view.

The drive device 5 comprises a motor unit 6 with an electric motor for driving the electric bicycle 1 and a first gear stage and a second gear stage, which are designed for driving the electric bicycle 1. The first gear stage is configured as a belt gear 10 and is connected, on the one hand, to the motor unit 6 and, on the other hand, to the second gear stage configured as a strain wave gear 20 and that is connected, on the one hand, to the first gear stage or the belt gear 10 and is configured to output or transmit, on the other hand, a torque for driving the electric bicycle 1. The side of the second gear stage that is coupled to the first gear stage thus constitutes a drive side of the strain wave gear 20. The side of the second gear stage provided for delivering the torque and driving the electric bicycle 1 thus represents an output side of the strain wave gear 20.

Figure 5:
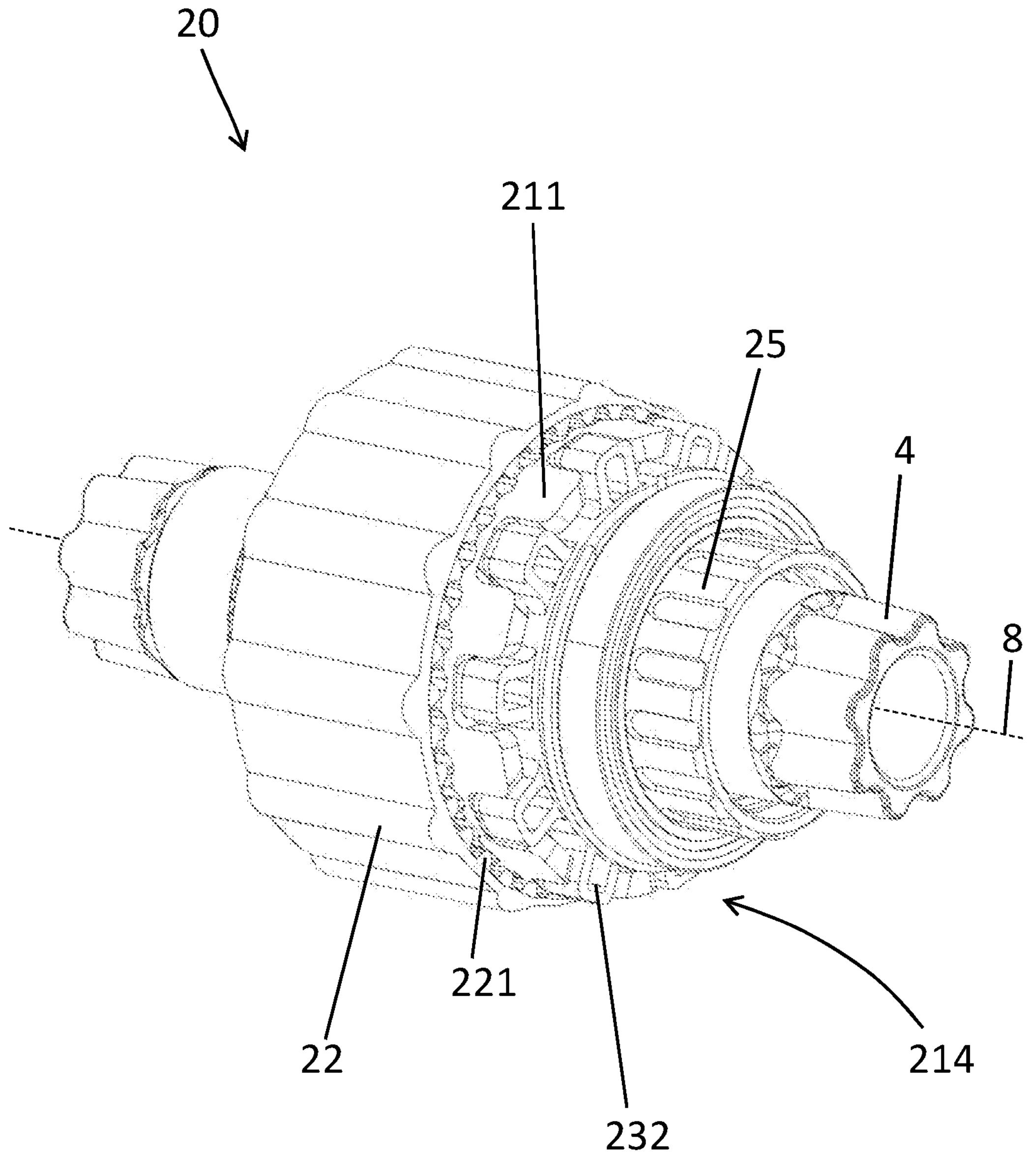
Figure 6:
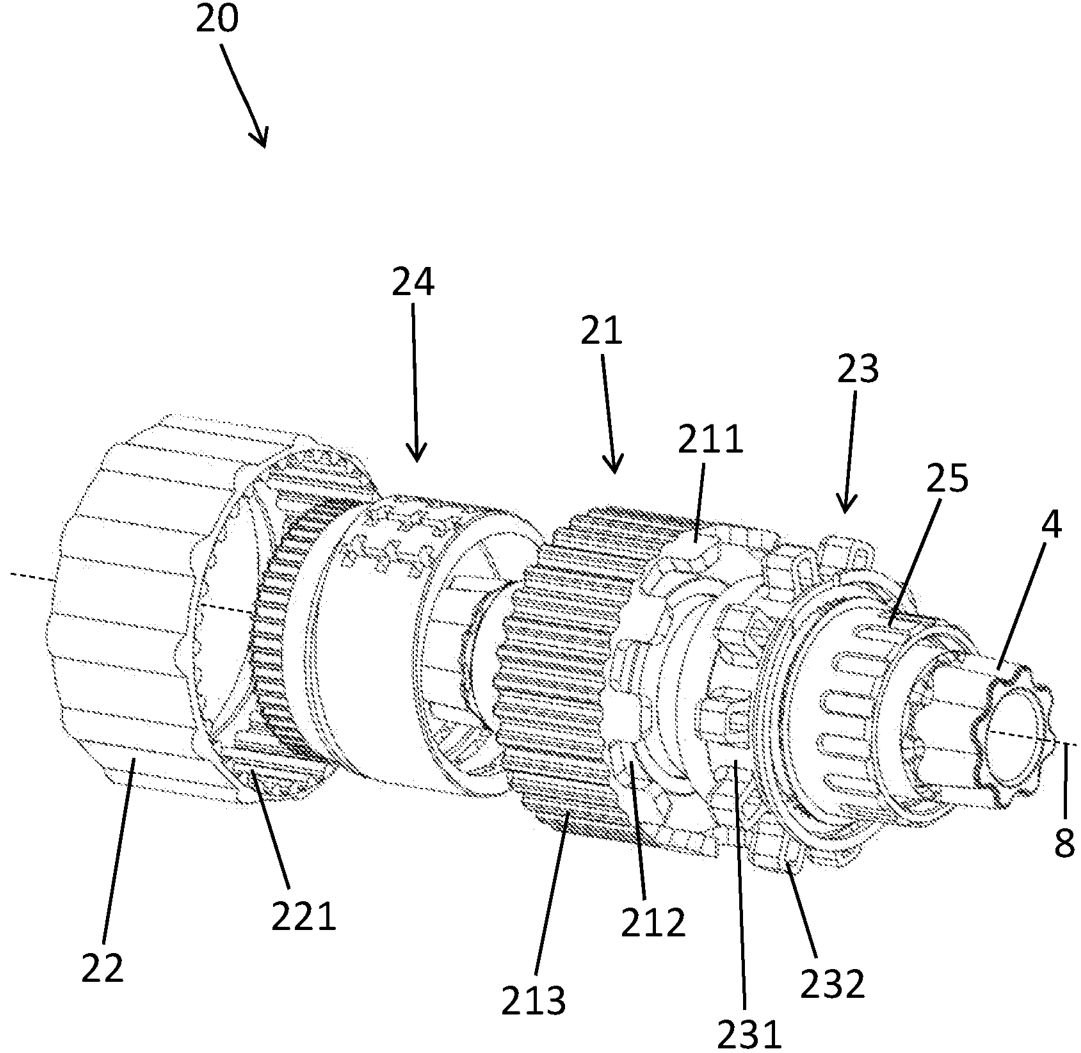
Figure 7:
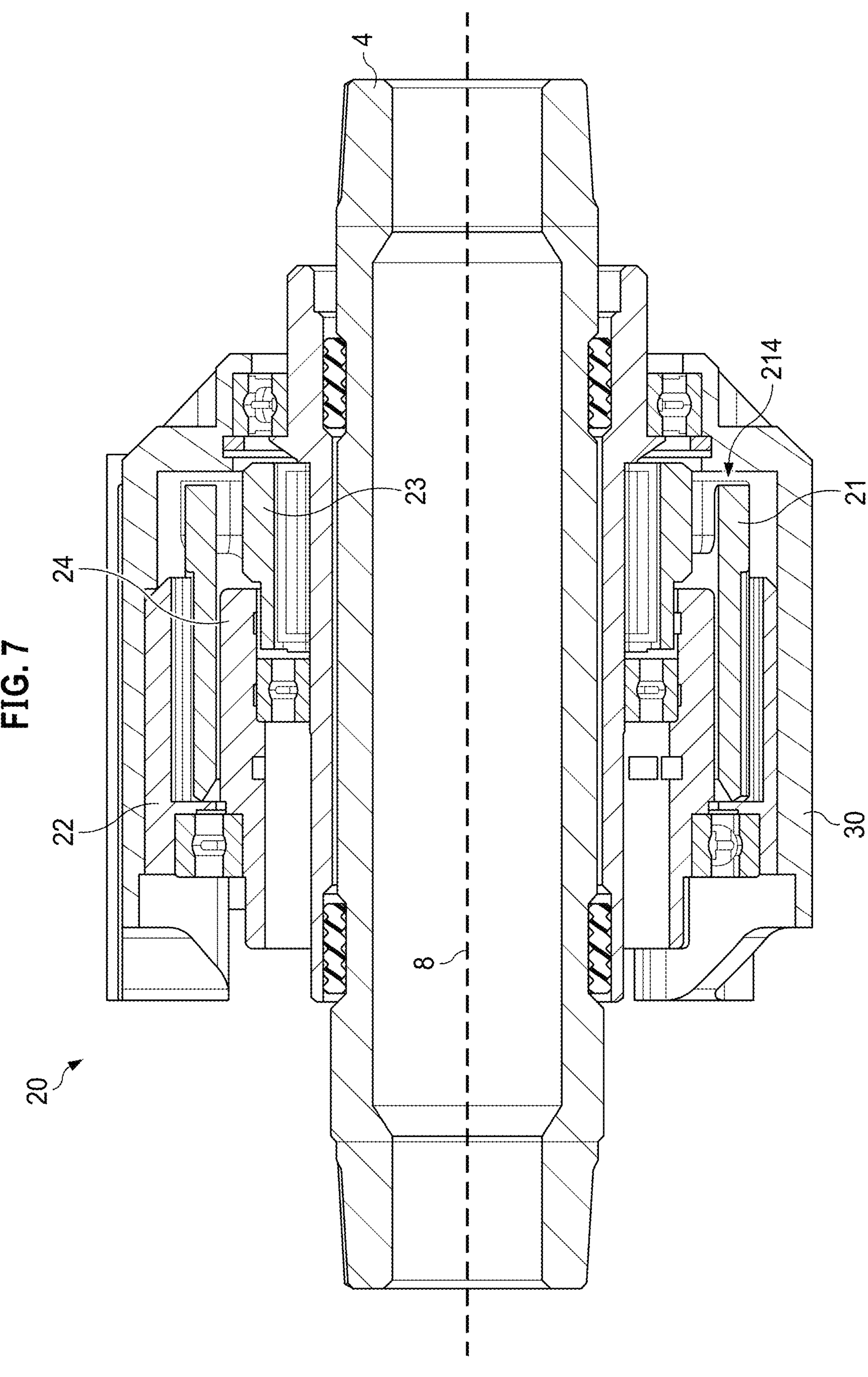
FIG. 7 shows a schematic view of a sectional view of a second gear stage of the drive device for the electric bicycle.

In particular, the drive device 5 is not coupled directly to the pedal crank 4, but by means of an output shaft 25, or can be coupled to the pedal crank 4 if required (see FIGS. 5 and 6). The output shaft 25 is in turn connected to a chain ring of the electric bicycle 1 by means of an adapter, a so-called "spider". The chain ring in turn drives a rear wheel of the electric bicycle 1 via a chain. A shaft of the pedal crank 4 can be decoupled from the output shaft 25 by a free wheel to prevent the cranks from being dragged along by the motor or the drive device 5.

The belt gear 10 comprises a first gear wheel 11 and a second gear wheel 12 as well as a belt element 13 coupling the two gear wheels 11, 12 to each other. The first gear wheel 11 is coupled to the motor unit 6 so that an axis of rotation 7 of the motor unit 6 coincides with an axis of rotation of the first gear wheel 11. The second gear wheel 12 is coupled to the strain wave gear 20 so that a rotation axis 8 of the pedal crank 4 coincides with a rotation axis of the strain wave gear 20 and the second gear wheel 12.

The strain wave gear 20 is configured to coaxially surround the pedal crank 4 with respect to the axis of rotation 8. The motor unit 6 and the belt gear 10, as well as the strain wave gear 20, are arranged such that the rotation axes 7 and 8 are substantially parallel to each other. Moreover, the motor unit 6, the belt gear 10 and the strain wave gear 20 are assembled together in a housing 30.

The strain wave gear 20 comprises a cylindrical outer ring 22 with internal toothing 221 (see FIGS. 5 and 6). The strain wave gear 20 further comprises an elastic transmission element 21 having an external toothing 213 predefined in coordination with the internal toothing 221 of the outer ring 22. In particular, the external toothing 213 of the transmission element 21 comprise fewer teeth than the internal toothing 221 of the outer ring 22. The strain wave gear 20 further comprises a radial coupling element 23, with the outer ring 22 acting as the input and the radial coupling element 23 acting as the output of the strain wave gear 20. The transmission element 21 is disposed between the outer ring 22 and the radial coupling element 23, and provides a predetermined transmission ratio due to the matched external toothing 213 and internal toothing 221. The strain wave gear 20 further comprises a wave generator 24, also referred to as a "wave generator", which is configured to provide predetermined deformation of the transmission element 21. The strain wave gear 20 thus realizes a so-called "harmonic drive".

Figure 3:
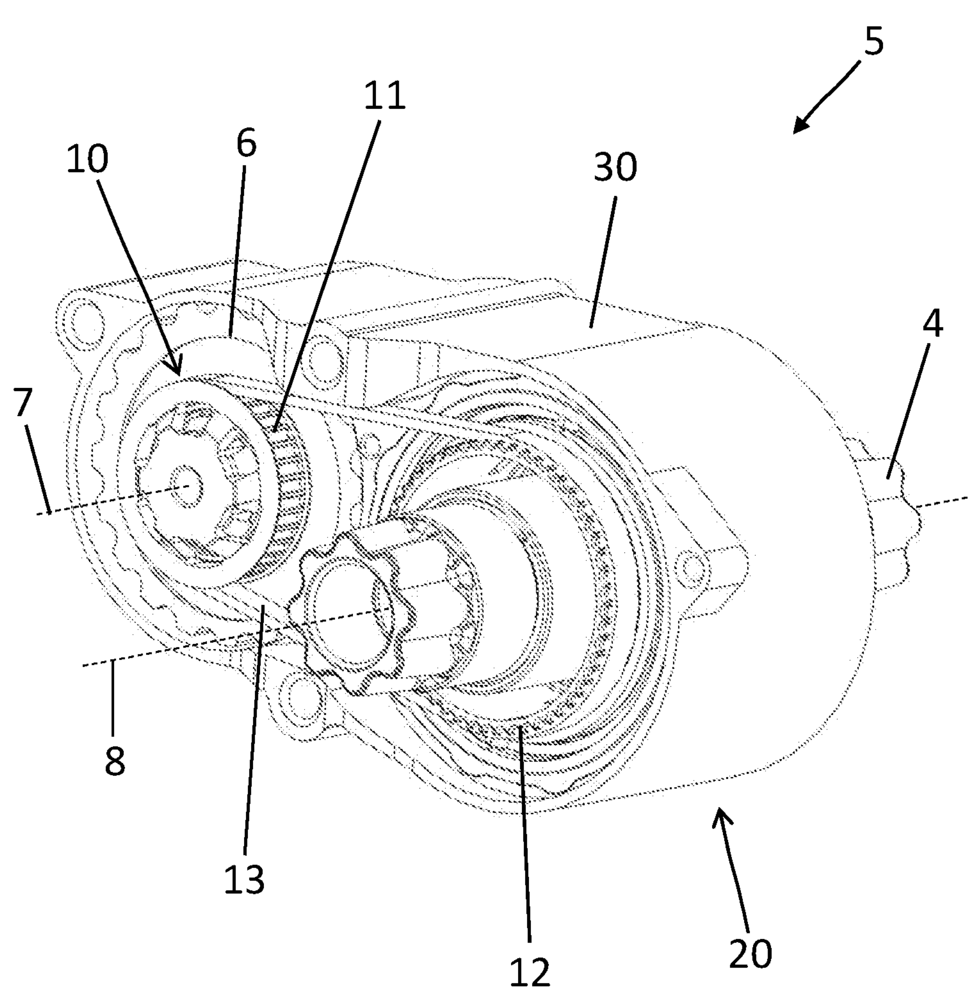
Figure 4:
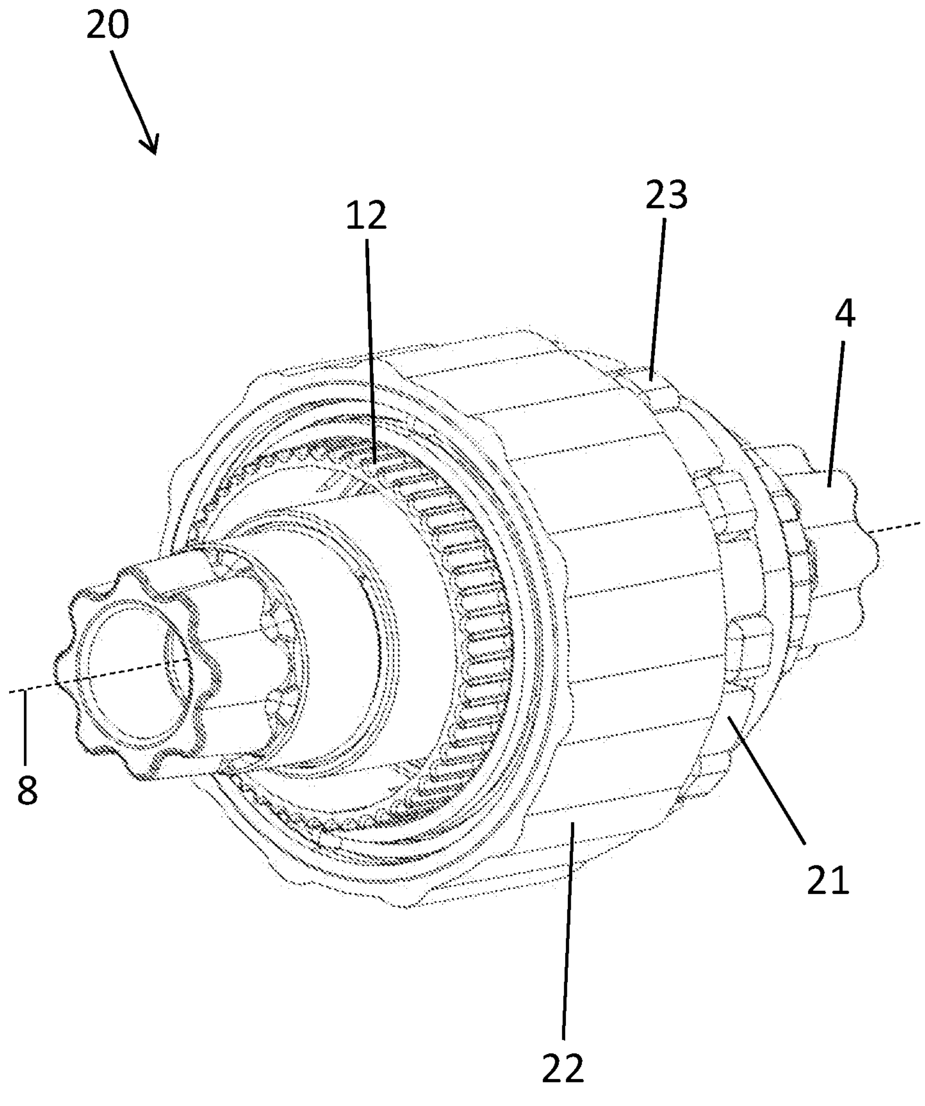

According to FIG. 3, the second gear wheel 12 of the belt gear 10 is in contact with the outer ring 22 of the strain wave gear 20 and acts as a drive in this respect. The radial coupling element 23 is coupled to the pedal crank 4 directly or by means of one or more transmission elements (see FIG. 5).

With respect to the axis of rotation 8, the radial coupling element 23 has, on an outer side, a plurality of radial projections 232 formed in coordination with a plurality of recesses 212 formed on an end face 214 of the transmission element 21 facing the radial coupling element 23. Thus, the radial coupling element 23 is couplable to the transmission element 21 along the axis of rotation 8 by the radial projections 232 engaging the recesses 212.

In other words, the transmission element 21 has a plurality of projections 211 extending along the end face 214 in the direction of the radial coupling element 23 and limiting the recesses 212 in a predetermined manner. The projections 232, in turn, also limit recesses 231 on the circumferential outer surface of the radial coupling element 23. In a coupled state of the transmission element 21 with the radial coupling element 23, the projections 211 also engage the recesses 231.

Preferably, the radial projections 232, 211 and the recesses 231, 212 are formed equidistantly distributed on the respective component. Alternatively, the projections 232, 211, and the recesses 231, 212 may be distributed differently and/or formed in different numbers.

The radial coupling element 23 enables a particularly short design of the strain wave gear 20 and also a decoupling of the drive device 5 from the pedal crank 4 or from the output shaft 25, in that the radial coupling element 23 is configured to be displaceable along the axis of rotation 8 and can be decoupled from the transmission element 21 (see FIG. 6). If required, the electric bicycle 1 can thus be used as a normal bicycle, so to speak, without having to rotate components of the drive device 5. This can be useful, for example, if the drive device 5 does not function without malfunction or requires maintenance.

The radial coupling element 23 is also coupled to the pedal crank 4 by means of the output shaft 25. Alternatively, the radial coupling element 23 may also be coupled directly or by means of one or more transmission elements to the pedal crank 4 or the output shaft 25.

By means of the drive device 5 described, a reliable drive concept for electric bicycles can be realized, which enables a particularly and space-saving structure. The drive device 5 is particularly suitable for mounting on a down tube or on a seat tube of the electric bicycle 1 and enables an advantageous drive system particularly with respect to a low noise level, a high efficiency and a small size.

The invention claimed is:

1. A driving device for an electric bicycle, the driving device comprising:

a motor unit comprising an electric motor configured to drive the electric bicycle;

a first gear stage; and a second gear stage, wherein the first gear stage is coupled to the motor unit and to the second gear stage, wherein the second gear stage is configured to output a torque configured to drive the electric bicycle, wherein the second gear stage is a strain wave gear and is arrangeable coaxially with respect to an axis of rotation of a pedal crank of the electric bicycle, wherein the first gear stage is a belt gear, which comprises a first gear wheel, a second gear wheel and a belt element, which couples the two gear wheels to one another, wherein the first gear wheel is coupled to the motor unit and the second gear wheel is coupled to the second gear stage, and wherein the second gear wheel of the belt gear is coupled to an outer ring of the strain wave gear and a radial coupling element is coupled to the pedal crank.

2. The drive device according to claim 1, wherein the radial coupling element has, with respect to the axis of rotation of the pedal crank, on an outer side, a plurality of radial projections arranged in coordination with a plurality of recesses formed on an end face of a transmission element facing the radial coupling element so that the radial coupling element is couplable to and decouplable from the transmission element along the axis of rotation of the pedal crank.

3. The drive device according to claim 2, wherein the radial projections of the radial coupling element, with respect to a state coupled to the transmission element, project along the axis of rotation of the pedal crank in a predetermined manner beyond the end face of the transmission element.

4. The drive device according to claim 1, wherein the second gear stage comprises:

a wave generator, the outer ring being a cylindrical outer ring with internal toothing, an elastic transmission element having external toothing preformed to match the internal toothing of the outer ring, and the radial coupling element, wherein the wave generator is configured for predetermined deformation of the transmission element, wherein the outer ring is an input and the radial coupling element is an output of the second gear stage, and wherein the transmission element is arranged between the outer ring and the radial coupling element and provides a predetermined transmission ratio of the second gear stage.

5. The drive device according to claim 4, wherein the radial coupling element has, with respect to the axis of rotation of the pedal crank, on an outer side, a plurality of radial projections arranged in coordination with a plurality of recesses formed on an end face of the transmission element facing the radial coupling element so that the radial coupling element is couplable to and decouplable from the transmission element along the axis of rotation of the pedal crank.

6. The drive device according to claim 5, wherein the radial projections of the radial coupling element, with respect to a state coupled to the transmission element, project along the axis of rotation of the pedal crank in a predetermined manner beyond the end face of the transmission element.

7. The drive device according to claim 1, wherein the second gear stage coaxially surrounds the pedal crank with respect to the axis of rotation of the pedal crank.

8. The drive device according to claim 1, wherein the motor unit and the two gear stages are arranged such that an axis of rotation of the motor unit is parallel to and spaced apart from the axis of rotation of the pedal crank.

9. A driving device for an electric bicycle, the driving device comprising:

a motor unit comprising an electric motor configured to drive the electric bicycle;

a first gear stage; and a second gear stage, wherein the first gear stage is coupled to the motor unit and to the second gear stage, wherein the second gear stage is configured to output a torque configured to drive the electric bicycle, wherein the second gear stage is a strain wave gear and is arrangeable coaxially with respect to an axis of rotation of a pedal crank of the electric bicycle, wherein the second gear stage comprises:

a wave generator, a cylindrical outer ring with internal toothing, an elastic transmission element having external toothing preformed to match the internal toothing of the outer ring, and a radial coupling element, wherein the wave generator is configured for predetermined deformation of the transmission element, wherein the outer ring is an input and the radial coupling element is an output of the second gear stage, and wherein the transmission element is arranged between the outer ring and the radial coupling element and provides a predetermined transmission ratio of the second gear stage.

10. The drive device according to claim 9, wherein a first gear wheel of the first gear stage is coupled to the outer ring of the strain wave gear and the radial coupling element is coupled to the pedal crank.

11. The drive device according to claim 10, wherein the radial coupling element has, with respect to the axis of rotation of the pedal crank, on an outer side, a plurality of radial projections arranged in coordination with a plurality of recesses formed on an end face of the transmission element facing the radial coupling element so that the radial coupling element is couplable to and decouplable from the transmission element along the axis of rotation of the pedal crank.

12. The drive device according to claim 11, wherein the radial projections of the radial coupling element, with respect to a state coupled to the transmission element, project along the axis of rotation of the pedal crank in a predetermined manner beyond the end face of the transmission element.

13. The drive device according to claim 9, wherein the second gear stage coaxially surrounds the pedal crank with respect to the axis of rotation of the pedal crank.

14. The drive device according to claim 9, wherein the motor unit and the two gear stages are arranged such that an axis of rotation of the motor unit is parallel to and spaced apart from the axis of rotation of the pedal crank.

* * * * *